(12) United States Patent
Fang

(10) Patent No.: US 7,213,250 B2
(45) Date of Patent: May 1, 2007

(54) OPTICAL DISK DRIVE WITH SOUNDPROOF MEMBER

(75) Inventor: Chao-Ching Fang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 233 days.

(21) Appl. No.: 10/747,183

(22) Filed: Dec. 30, 2003

(65) Prior Publication Data
US 2004/0154032 A1 Aug. 5, 2004

(30) Foreign Application Priority Data
Dec. 31, 2002 (TW) .............................. 91221691 U

(51) Int. Cl.
*G11B 33/08* (2006.01)
(52) U.S. Cl. ..................................................... 720/651
(58) Field of Classification Search ................ 720/651, 720/648, 646, 600; 360/97.02, 97.03, 97.04; 369/263.1
See application file for complete search history.

(56) References Cited

U.S. PATENT DOCUMENTS 5,021,905 A * 6/1991 Sleger ...................... 360/97.02
6,501,644 B1 * 12/2002 Silverman et al. .......... 361/685

FOREIGN PATENT DOCUMENTS

JP 2004-332868 A * 11/2004

* cited by examiner

*Primary Examiner*—Julie Anne Watko
(74) *Attorney, Agent, or Firm*—Birch, Stewart, Kolasch & Birch, LLP

(57) ABSTRACT

An optical disk drive, including a body, a tray, a panel, and at least one soundproof member. The tray is moveably disposed in the body. The panel is connected to the body, the connection therebetween is sealed by the least one soundproof member, thereby lowering noise produced by high rotational speed of the disk drive.

8 Claims, 5 Drawing Sheets

OPTICAL DISK DRIVE WITH SOUNDPROOF MEMBER

This Nonprovisional application claims priority under 35 U.S.C. § 119(a) on Patent Application No. 091221691 filed in TAIWAN on Dec. 31, 2002, the entire contents of which are hereby incorporated by reference.

BACKGROUND OF THE INVENTION

1. Field of the Invention

The present invention relates to an optical disk drive, and in particular to an optical disk drive reducing noise generated by high speed rotation.

2. Description of the Related Art

Technical advances have enabled optical disk drives to rotate faster to meet high speed demands. High speed optical disk drive operation, however, generates excessive noise and further improvement is required.

FIGS. 1a and 1b are schematic views of a conventional optical disk drive. The conventional disk drive 10 has a body 11, a panel 12, and a tray 14. The tray 14 is slidably disposed in the body 11, and supports an optical disc 16. The optical disc drive 10 further comprises an optical pickup, several motors, and other elements. Since such devices are not directly related to this invention, their detailed description is omitted.

Recently, the rotational speed of optical disc drives has increased to meet high performance requirements. However, when an optical disc is placed in a high-speed optical disc drive, noise is generated by air flow created by high-speed rotation, and from operation of the motor. Noise escapes through gaps between the body 11 and the panel 12, such as gaps at connections between the body 11 and the panel 12, and between the panel 12 and the buttons 13, causing noise to be carried by air through the gaps.

As shown in FIG. 1b, the conventional optical disk drive 10 does not contain any soundproof members, hence, high speed optical disk drive operation inevitably generates excessive noise.

SUMMARY OF THE INVENTION

Thus, an object of the invention is to provide an optical disk drive with soundproof members, filling gaps therein to block air movement, thereby reducing noise level generated by high rotational speed.

The present invention provides an optical disk drive, including a housing and at least one soundproof member. The housing includes a body. The tray is slidably disposed in the body, and the optical disc is disposed on the tray. There are gaps formed in the housing and as a result noise is transmitted to outside by air. The soundproof member is used to fill or cover any gaps in the housing, thereby reducing the noise level.

The housing further includes a body and a panel and a gap exists at the connection between the body and the panel. Thus, the soundproof member is disposed in and surrounds the gap between the body and the panel.

The present invention also provides an optical disk drive with a soundproof member, disposed between a first face of the body and the second face of the panel.

The soundproof member is further disposed in the gap around the button on the first face of the panel.

The soundproof member can be a sound absorption material, tape, paper, adhesive strip, glue, or a combination thereof.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

Figure 1A:
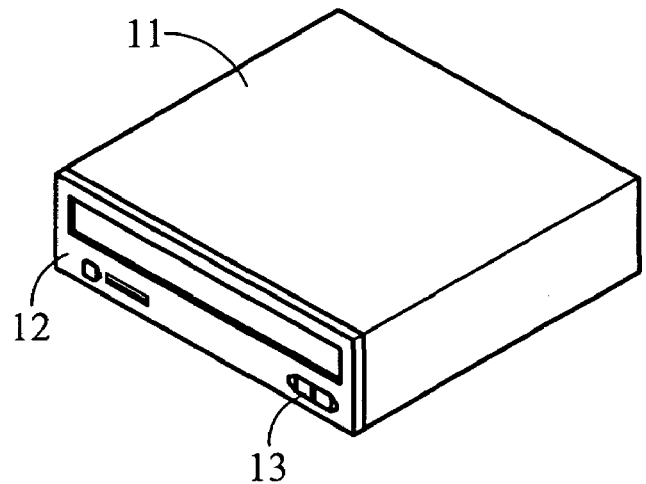
FIG. 1a is a schematic view of a conventional optical disk drive.
Figure 1B:
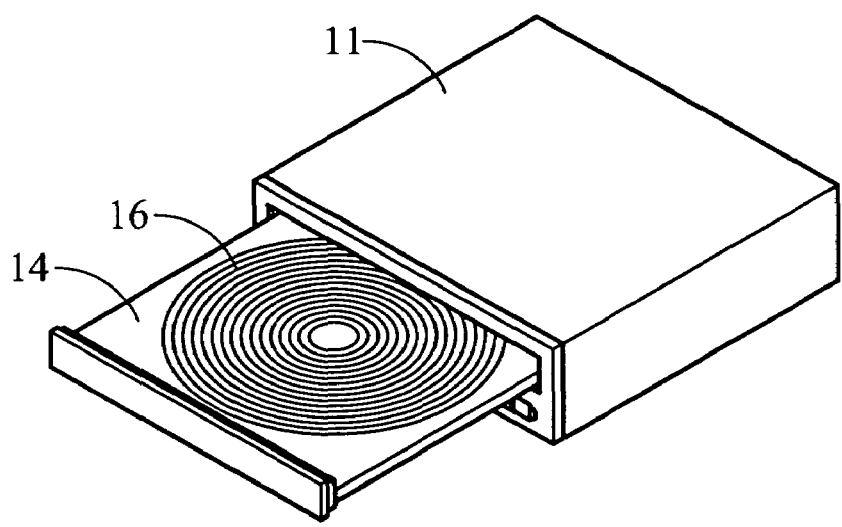
FIG. 1b is a schematic view of the conventional optical disk drive with tray ejected.
Figure 2A:
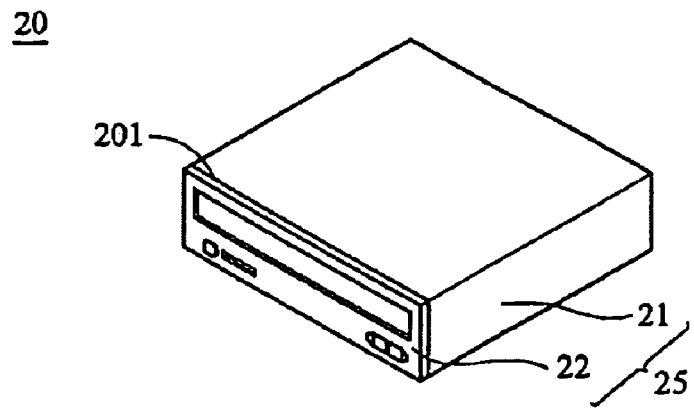
FIG. 2a is a schematic view of an optical disk drive according to the invention.
Figure 2B:
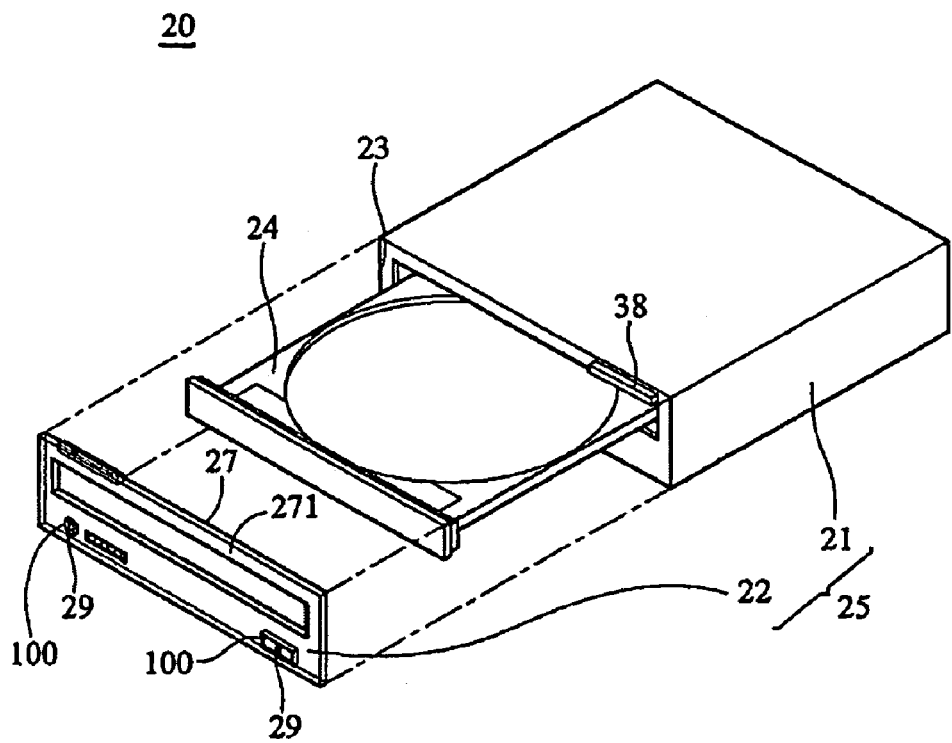
FIG. 2b is an exploded view of the optical disk drive according to the invention.

FIGS. 2a and 2b are schematic views of an optical disk drive of the present invention. The optical disk drive has a housing 25, composed of a tray 24, a panel 22, and a body 21. The panel 22 has a slot, allowing a tray-type or a slot-type CD-ROM or DVD-ROM to load or unload an optical disk (not shown). Several types of barely visible gaps are formed in different portions in the housing 25, such as a linear gap 201 (in FIG. 2a), located on the joint between the panel 22 and the body 21, and a button gap 100 (in FIG. 2b), formed between the panel 22 and buttons 29.

Specifically, the panel 22 of the housing 25 has a first face 27 (connecting surface) and an exposed surface 271 opposite thereto, and the body 21 has a second face 23. When the panel 22 and the body 21 are engaged, the first face 27 contacts the second face 23. As the panel 22 and the body 21 meet, since the first face 27 and the second face 23 are not integrally formed, the connection between the panel 22 and the body 21 forms a linear gap 201. In addition, several holes, accommodating the buttons 29, are also formed on the panel 22. As a result, the surrounding area between the panel 22 and the button 29 forms a button gap 100. As the optical disk drive begins rotating, noise escapes from the housing 25 through the linear gap 201 or the button gap 100. Henceforth, the present invention introduces soundproof members 38, inserted in or covering the gaps such as gaps 100 and 201, to reduce the level of noise escaping from the inner housing 25. The following describes the first embodiment of the present invention.

First Embodiment

Figure 3A:
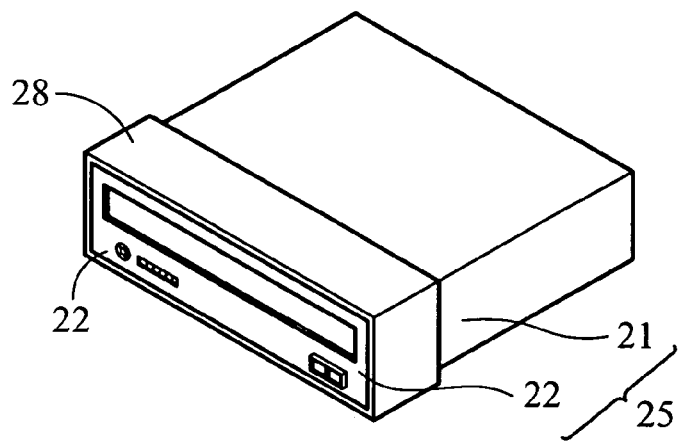
FIG. 3a is a schematic view of the optical disk drive according to the first embodiment of the invention.
Figure 3B:
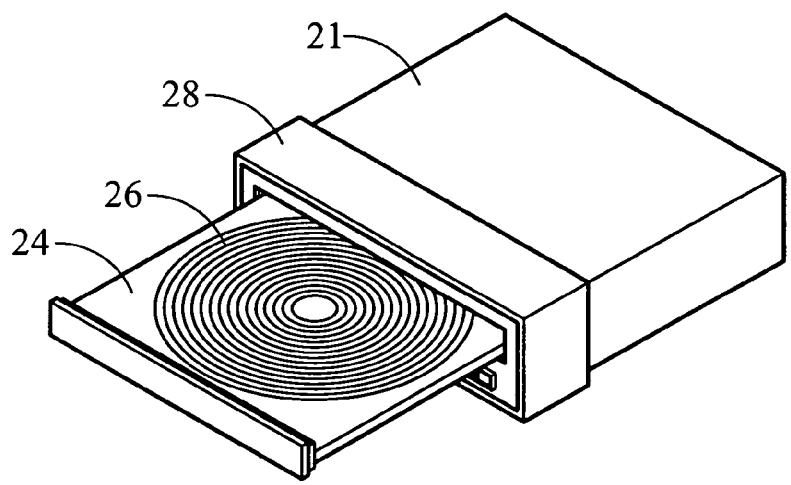
FIG. 3b is a schematic view of the optical disk drive with an ejected tray according to the first embodiment of the invention.
Figure 3C:
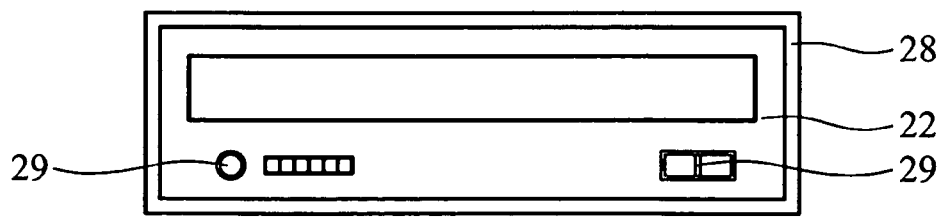
FIG. 3c is a front view of the optical disk drive according to the first embodiment of the invention.

FIGS. 3a, 3b, and 3c illustrate the first embodiment of the optical disk drive 20, generating a negligible noise level. In this embodiment, a soundproof member 28 is used to enclose the housing 25 to completely seal the linear gap 201, thereby preventing noise from escaping through the linear gap 201. Although the soundproof member 28 completely seals the gap 201 between the panel 22 and the body 21, the soundproof member 28 does not hinder ejection of disk 26 from tray 24 from ejecting disk 26 from the panel 22 of the optical disk drive 20, as shown in FIG. 3b. FIG. 3c is the front view of the panel 22. This figure shows that the body 21 is surrounded and covered by the soundproof member 28 (or just surrounding a part of the body 21) to completely or partially seal the gaps between the body 21 and the panel 22, thereby reducing noise generated by high rotational speed. The laboratory recorded experimental noise level data is shown in Table 1. It should be noted that results can change due to measurement conditions, installation differences, room temperature, humidity, distance of sound recording, or control methods. The following is reference data collected from laboratory testing:

TABLE 1

| | Noise Level (decibel, dB) | | | | | |
|---|---|---|---|---|---|---|
| | Trial 1 | Trial 2 | Minimum | Maximum | Difference | Average |
| With soundproof member | 41.1 | 41.6 | 41.1 | 41.6 | 0.5 | 41.4 |
| Without soundproof member | 44.2 | 44.5 | 44.2 | 44.5 | 0.3 | 44.4 |

When the gaps 201 are sealed by the soundproof member 28, the average noise level is approximately 41.4 dB. Conversely, when not sealed, the level rises to about 44.4 dB. Therefore, when the gap 201 between the body 21 and the panel 22 is sealed by the soundproof member 28 of the present invention, the noise level can be reduced by approximately 3 dB. The data is recorded in an acoustic box, at room temperature with uncontrolled humidity level. Additionally, the microphone (recorder) is placed about fifty meters in front of the tested optical disk drive. Moreover, the optical disk drive is controlled to rotate at a constant speed. Consequently, when testing conditions are modified, the recorded dB level varies. The recorded data proves that by implementing the soundproof member 28 according to the first embodiment, in which the gap 201 between the body 21 and the panel 22 is sealed, the present invention reduces the noise level by 3 dB. In the first embodiment, the soundproof member 28 is a tape of imperforated material. It can be replaced by other materials such as paper, adhesive strips, glue, or a combination thereof.

Second Embodiment

Figure 4:
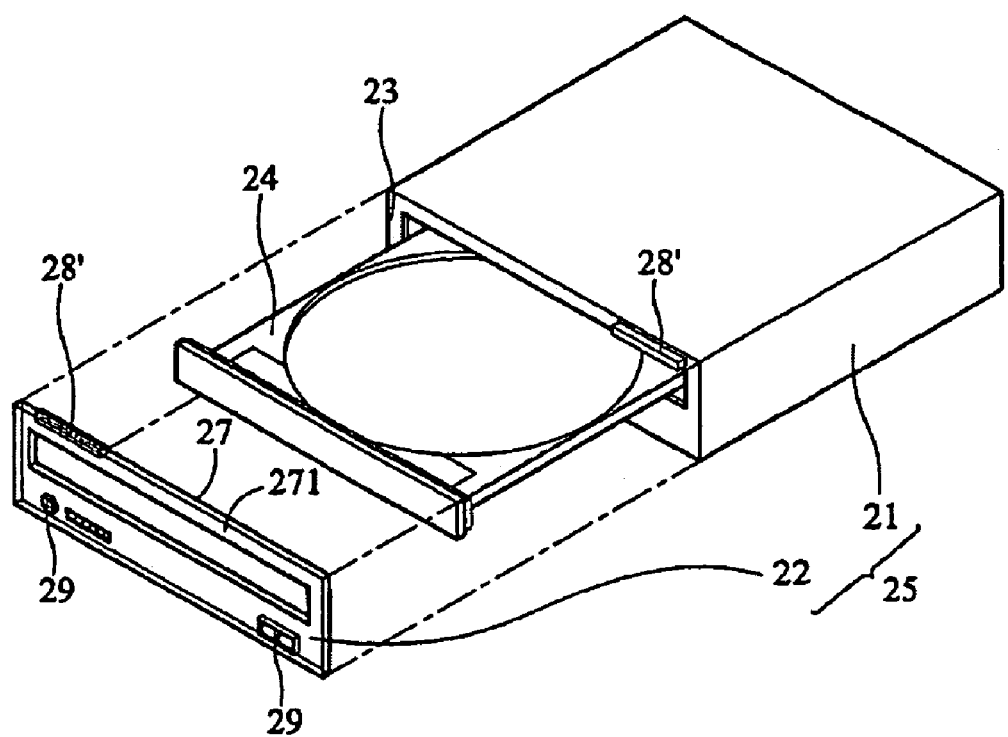
FIG. 4 is an exploded schematic view of the optical disk drive according to the second embodiment of the invention.

FIG. 4 is an exploded schematic view of the optical disk drive according to the second embodiment of the invention. Since the interfaces on the first face 27 and the second face 23 between the panel 22 and the body 21 have uneven surfaces, the intersection of two faces creates a gap 201. Therefore, in this embodiment, soundproof member 28' (such as sound-absorbing cotton material) is disposed between the first face 27 of the panel 22 and the second face 23 of the body 21, to directly fill in the gap 201 between the panel 22 and the body 21, reducing noise from the housing 25. Moreover, the soundproof member 28' disposed between the first face 27 and the second face 23, does not hinder the disk loading or unloading. Experimental noise level tests show that when the gap is not sealed, the average noise level is about 43.1 dB. When perfectly sealed, the noise level was recorded as 41.9 dB. Therefore, as the gaps between the first face 27 of the panel 22 and the second face 23 of the body 21 are filled with the soundproof member 28', a noticeable noise level drop of 1.2 dB is achieved. Thus, by employing the second embodiment, sealing the first face 27 of the panel 22 and the second face 23 of the case 21, a noise level reduction of approximately 1.2 dB can be attained.

In the second embodiment, the soundproof member 28' can be a sound absorption material, tape, paper, adhesive strip, glue, or a combination thereof.

Third Embodiment

Figure 5A:
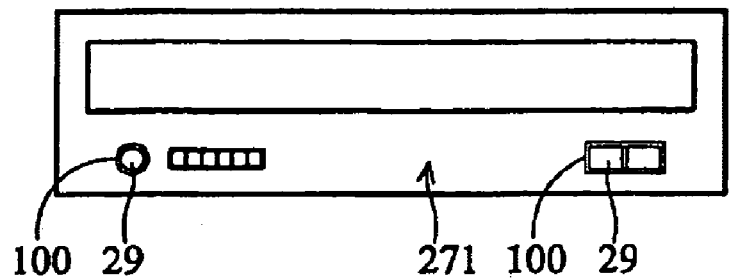
FIG. 5a is a front view of the panel of the optical disk drive according to the invention.
Figure 5B:
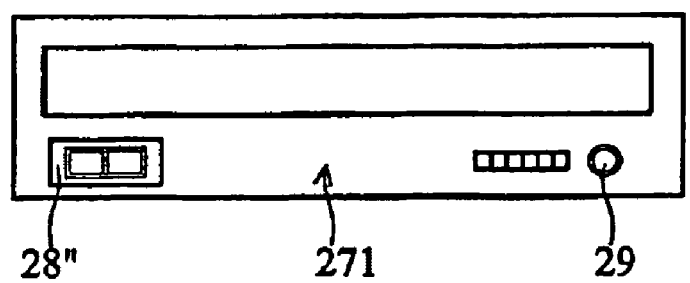
FIG. 5b is a rear view of the panel according to the third embodiment of the invention.

FIGS. 5a and 5b are schematic views according to the third embodiment. FIG. 5a is a front view of the panel of the present invention. FIG. 5b is a rear view of the panel. The gap 100 between the panel 22 and the button 29 is sealed by a soundproof member 28" such as tape. Also the soundproof member 28" is disposed on the first face 27 of the panel 22 to prevent noise from escaping from the gap 100. Table 2 shows the laboratory results of noise level testing. The results may differ according to measurement conditions, installment differences, room temperature, humidity, distance of sound recording, or controlling methods. The following Table 2 shows the results of the laboratory testing:

TABLE 2

| | Noise Level (dB) | | | | | | | |
|---|---|---|---|---|---|---|---|---|
| | Trial 1 | Trial 2 | Trial 3 | Trial 4 | Minimum | Maximum | Difference | Average |
| With soundproof member | 40.9 | 40.3 | 39.9 | 40.7 | 39.9 | 40.9 | 1.0 | 40.5 |
| Without soundproof member | 42.7 | 42.3 | 42.4 | 42.3 | 42.3 | 42.7 | 0.4 | 42.4 |

As the gap 100 is sealed by the soundproof member 28", the average noise level is about 40.5 dB. When not sealed, the average noise level is about 42.4 dB. Therefore, by disposing a soundproof member 28" on the first face 27, sealing the gap 100, average noise level is reduced by 1.9 dB.

The soundproof member 28" of the third embodiment can be one of the sound absorption material, tape, paper, adhesive strip, glue, or a combination thereof.

Since there are gaps formed in the body or the panel of the optical disk drive, noise generated by high rotational speed inevitably escapes and is transmitted by air. According to the above embodiments, the soundproof members reduce the noise level by about 1.2 dB to 3 dB, as proved by experiment results. The calculation of the reduced noise level values of do not correspond to a linear scale of values, but rather to a logarithmic function that establishes noise intensity in accordance with the superposition of sounds and the distance at which they are produced. For example, if each embodiment lowers the noise level by about 2 dB, installing two types of soundproof members does not provide a linear reduction in noise level of 4 dB. Thus the use of soundproof members on the optical disk drive is an economical and an efficient method of drastically reducing noise level.

While the invention has been described by way of example and in terms of the preferred embodiments, it is to be understood that the invention is not limited to the disclosed embodiments. To the contrary, it is intended to body various modifications and similar arrangements (as would be apparent to those skilled in the art). Therefore, the scope of the appended claims should be accorded the broadest interpretation so as to encompass all such modifications and similar arrangements.

What is claimed is:

1. An optical disk drive, comprising:
   a housing, having at least one gap, a panel and a body, wherein the panel is connected with the body;
   at least one soundproof member, disposed in the gap; and
   at least one button, wherein the gap is defined between the panel and the button.

2. The optical disk drive as claimed in claim 1, wherein the panel is connected with the body.

3. The optical disk drive as claimed in claim 2, wherein the soundproof member is disposed on an interface between to panel and the body.

4. The optical disk drive as claimed in claim 1, wherein the soundproof member is tape.

5. The optical disk drive as claimed in claim 1, wherein the soundproof member is paper.

6. The optical disk drive as claimed in claim 1, wherein the soundproof member is an adhesive strip.

7. The optical disk drive as claimed in claim 1, wherein the soundproof member is glue.

8. The optical disk drive as claimed in claim 1, wherein the soundproof member is a sound absorption material.

* * * * *